V. MICHAELIS.
Apparatus for the Manufacture of Vinegar.
No. 9,754. Reissued June 14, 1881.
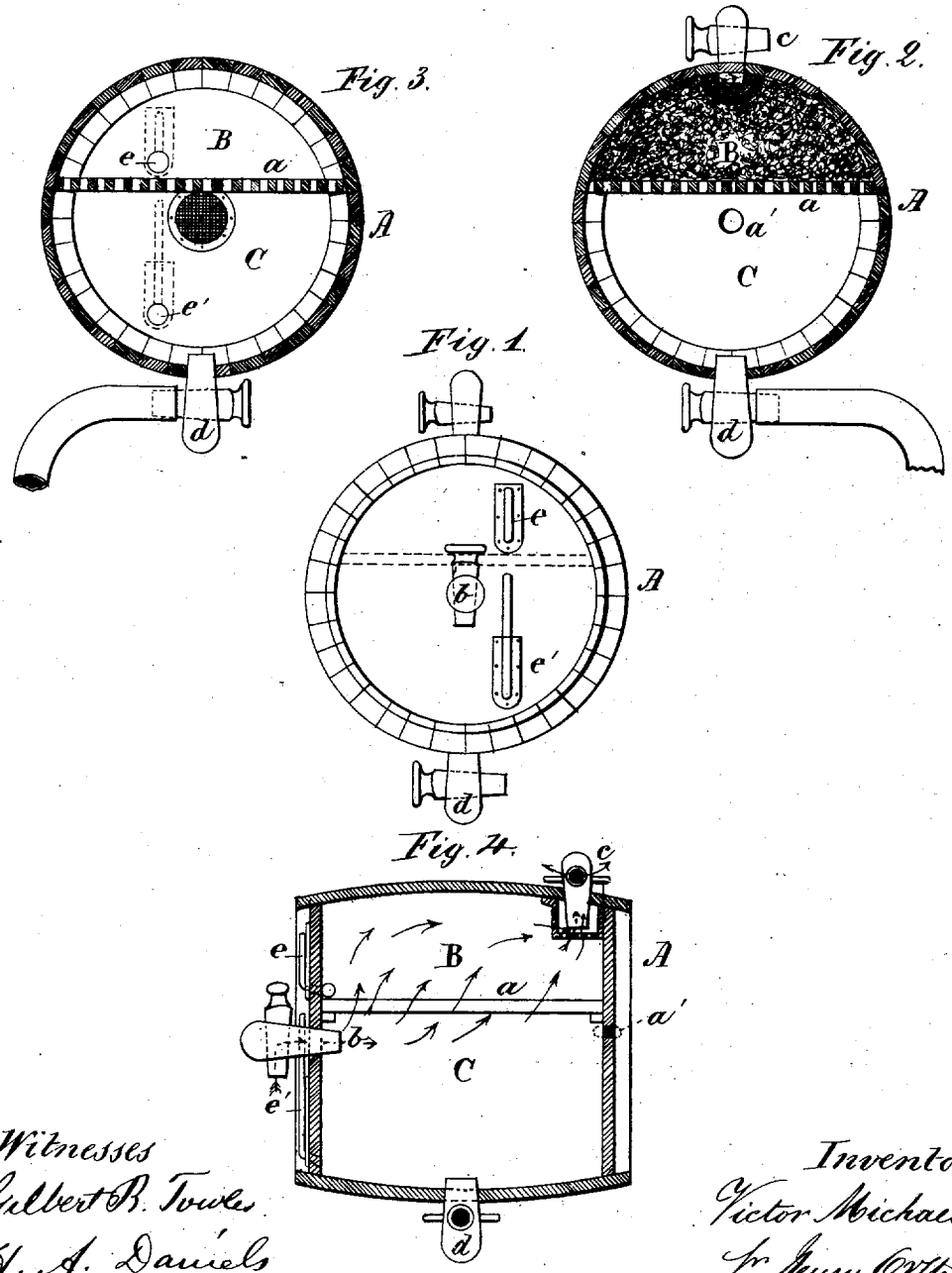
Witnesses
Gilbert R. Towles
H. A. Daniels
Inventor
Victor Michaelis
by Henry Orth
att'y.
N. PETERS, Photo-Lithographer, Washington, D. C.

UNITED STATES PATENT OFFICE.

VICTOR MICHAELIS, OF ROLLINGERGRUND, LUXEMBURG.

APPARATUS FOR THE MANUFACTURE OF VINEGAR.

SPECIFICATION forming part of Reissued Letters Patent No. 9,754, dated June 14, 1881.

Original No. 227,564, dated May 11, 1880. Application for reissue filed October 26, 1880. Patented in France September 26, 1878, in Germany January 11, 1879, in Belgium January 28, 1879, in Italy June 30, 1879, in Spain August 1, 1879, and in England October 6, 1879.

*To all whom it may concern:*

Be it known that I, VICTOR MICHAELIS, a citizen of Luxemburg, residing at Rollingergrund, have invented new and useful Improvements in Apparatus for Manufacturing Vinegar, of which the following is a specification, and for which invention I have obtained Letters Patent in France under date of September 26, 1878, in Germany under date of January 11, 1879, in Belgium January 28, 1879, Italy June 30, 1879, Spain August 1, 1879, and in England October 6, 1879.

My invention relates to an improved method and apparatus for manufacturing vinegar, and has for its object the more speedy acetification of the material or liquor employed, followed by less evaporation of alcohol or aldehyde than in apparatus hitherto used; and it consists in the gradual acetification of a certain quantity of liquor to be acetified by the following steps, to wit: first, bringing in contact an acetifying or fermenting material with the liquor to be acetified; second, partly isolating the two substances from each other after saturation of the acetifying material has taken place by rolling the apparatus once around; third, passing a current of air through the saturated and partly-isolated acetifying material from a point above the level of the charge of liquor to be acetified to a point above said acetifying material, opposite to the point of admission, to produce fermentation and acetification; and, finally, repeating the operation until the whole charge is acetified, all effected in one and the same apparatus, substantially as hereinafter fully described.

The invention further consists in an improved construction of apparatus.

In order that my invention may be better understood, I will first describe the process and afterward the apparatus for carrying the same into effect.

In the acetification of liquids, especially by means of a fermenting or acetifying material, one of the most essential points to be observed to make this process a rapid and economical one is to completely isolate the liquid to be acetified from the acetifying or fermenting part of the acetifying material after the latter has been saturated, to be then subjected to the action of a current of atmospheric air, to induce and maintain fermentation. Another essential point to be observed is to give such a direction to the current or currents of air as to cause them to pass through the whole mass of the acetifying material, and the initial and terminal orifices through which the air enters to and escapes from the material should be so arranged as to maintain a strong and continuous draft through the said material; and in carrying out the process I proceed as follows:

Into any suitable apparatus capable of being rotated (preferably the apparatus hereinafter described) I introduce a quantity of beechwood shavings, or other like fermenting or acetifying material, and after the apparatus is completely filled with such material I introduce a charge of liquor to be acetified. I then invert or rotate the apparatus, after having closed the initial and terminal air-orifices, to bring the liquor in contact with the shavings and to saturate the latter. I then bring the apparatus in its normal position to allow all of the liquor not absorbed by the shavings to flow back into the part of the apparatus below the initial orifice through which the air enters, and in this manner isolate the saturated mass of acetifying material from the body of the liquid. This isolation is of great importance, for the reason that so long as that part of the shavings is exposed to the current of air passing through it to effect fermentation the *Mycoderma aceti* are fostered and developed amid the shavings. To prevent the *Mycoderma aceti* from being washed away when rotating the apparatus it is necessary that this rotation should be performed rapidly, so that the isolated part of the shavings is passed quickly through the liquor and merely becomes saturated. I then establish a current of air through the body of saturated shavings in such a manner as to permeate them thoroughly by admitting the air at a point below said upper part of the shavings, above the level of the underlying liquor, and allowing it to escape at a point above said shavings diagonally opposite to the point of admission. The saturated and acetifying part of the shavings is now subjected to the action of the current of atmospheric air for a sufficiently long time to produce fermentation and the complete acetification of the liquor absorbed by said shavings, when the air is cut off and the acetifying part of the shavings is again brought into contact with the body of the liquid to be acetified, thereby extracting the acetified liquid contained by the shavings, which is replaced by fresh liquid. When this resaturation is effected the upper part of the shavings is again isolated from the liquid and subjected to a current of atmospheric air, repeating this operation until the whole charge of the liquid is acetified, when it may be withdrawn and a fresh charge made to take its place.

It will be seen from what has been said above that only a small portion of the liquid is converted into vinegar at a time, and this conversion is effected so much more rapidly, owing to the isolation of this small portion from the main body of the liquid, as above set forth, and a strong upward natural current of air passing through this isolated part of the shavings. This strong natural current of air is created by the following process, to wit: The fermentation which takes place in the upper isolated part of the acetifying material, after saturation, heats the air within the apparatus. The air-inlet orifice is placed at the front head of the apparatus, as low as possible above the level of the liquid to be acetified. The air-outlet pipe is placed as high as possible in top of the apparatus, diagonally opposite the initial orifice. The hot air in the apparatus in trying to rise is continually discharged as long as the air-outlet pipe is open, and the atmospheric air is thereby attracted at the air-inlet orifice, thus a draft is created through the acetifying material, as shown in the accompanying drawings by the arrows, and as the position of the air-inlet and air-outlet orifice is such that they act like a draft-chimney, the air-current, which is of the greatest importance for acetification, is created stronger in this apparatus than in any other hitherto used. The effect might be even heightened if the air-outlet orifice is placed at a point in top of the apparatus on its widest diameter, and one air-inlet orifice is placed at the front head and another one on the rear head; but as the rear heads are usually lying against a wall such an arrangement would be impracticable, and besides the evaporation of alcohol would be greater, as the air-outlet orifice would have to be considerably wider than the inlet-orifices to avoid a counter current of air.

Having now described the various steps of the process, I will proceed to describe the apparatus which I have found best suited to carry it into effect. This apparatus consists, chiefly, in its peculiar construction and arrangement, whereby said process is carried out rapidly, economically, and with great facility.

In the accompanying drawings, Figure 1 is a front elevation; Figs. 2 and 3, vertical transverse sections, looking from front to the rear and from the rear to the front of the apparatus respectively; and Fig. 4 is a vertical longitudinal section of the apparatus.

A represents a cask or barrel of any desired dimension, though I have found in practice that casks having a capacity of about six hundred liters give the best results. The cask A is divided into two unequal chambers, B C, by a wooden grate, *a*, the top space, or that B above the grate, being the smaller of the two. Immediately below the grate *a* in the center of the rear head of the cask is a feed-aperture, *a'*, closed by a bung, stop-cock, or other like device, through which the chamber C is supplied with the liquor to be acetified. The chamber C is further provided with an air-supply orifice, *b*, arranged in the front head of the cask, and the chamber B communicates with an air-discharge cock, *c*, arranged on top of the cask, near or at the rear head.

*d* is a drawing-off cock arranged in the bottom of the cask at or near its point of greatest diameter, and communicates with the lower chamber, C, which latter is also provided with a level-indicator, *e'*, arranged in the front head for obvious purposes, while the chamber B is provided with a thermometer, *e*, which enables the operator to ascertain at all times the progress of the operation of acetification, avoiding thereby the necessity of sampling or testing the liquor, as the decrease in temperature will indicate the progress of the operation and enable the operator to regulate the saturation of the beech-wood chips.

The upper chamber, B, having been packed with beech-wood chips, or shavings, or other like substance, the operation of the apparatus is as follows: When casks of the above-described capacity are employed the lower chamber, C, is supplied with about two hundred and forty liters of liquor, introduced through the feed-aperture *a'* in any convenient manner and by any suitable means, either through an angular funnel or through a flexible feed-pipe coupled to a feed-cock and connected with a feed-tank, or by means of telescopic jointed pipe, the drawing-off cock *d* being, of course, closed. When the level-indicator indicates that the desired quantity of liquor has been fed to the chamber C the feeding devices are disconnected from the cask, the air-supply orifice and escape-cock *b c* are closed, and the cask is rolled once round to allow the liquor to pass through the beech-wood shavings in the chamber B, and to saturate the same. When the apparatus is rolled back again into its normal position with the chamber B on top, as shown in the drawings, all the liquor not absorbed by the shavings flows back again into the chamber C, and the air-supply orifice and escape-cock *b c* being now opened a current of air is established, as the arrows show in the drawings, from the front upward to the rear of the cask, which will in a very short time cause the temperature of the beech-wood shavings to rise, which rise will continue until the temperature in chamber B will be considerably above that of the surrounding atmosphere, and in this condition the apparatus is allowed to remain for a certain number of hours, when the operation of saturation is renewed, as before, and repeated until all the liquor in the apparatus is converted into vinegar, the time required therefor varying from sixteen to nineteen days, according to the percentage of alcohol used for the liquor to be acetified.

The number of daily saturations and the time required for the complete acetification of a charge of liquor will depend greatly on the material employed for producing the fermentation and acetification, as well as on the nature of the liquor to be acetified, and when the acetification has taken place (the time for which I have found never to exceed nineteen days) the vinegar is drawn off from the lower part, C, through the drawing-off cock *d*, and a new charge of liquor is supplied.

To prevent the beech-wood chips or shavings from penetrating in and obstructing the passage of the air-escape cock *c*, I surround the aperture with a wicker grating, D, as shown, or with a wooden perforated box attached to the cask by means of wooden pins.

In practice I arrange the casks in the factory in series of superposed tiers transversely upon longitudinal girts or supports, leaving sufficient room at the end of each tier to roll one cask completely over. By these means one man can attend to a great number of casks, as he has, at stated periods, but to roll the casks of each tier from one side to the other, turning each cask completely over, and by the time he has accomplished this only a few minutes are spent. This operation is effected three to six times daily.

In the manufacture of alcohol-vinegar I obtain the same results—*i. e.*, the same percentage of acidity as is obtained with the usual graduators—while my apparatus has the advantage over said graduators in a saving of alcohol, as well as in the cost of construction and labor.

When vinegar is manufactured from materials that will, during fermentation, produce large quantities of scum or slime, like the juices of fruit or vegetables, or honey, beer, or malt, and other like substances, the advantages of my apparatus over the usual graduators or upright converters will be still more apparent to those conversant with this branch of manufacture, knowing, as they do, the time and labor that are required to free these converters from such scum or slime, which in a short time renders them inoperative, and is to a great extent almost a bar to their use, while the cleaning of my apparatus, or the removing therefrom of any scum or slime, is effected rapidly and with comparatively little labor by coupling a steam-conducting pipe to the air-inlet orifice *b*, opening the drawing-off cock *d*, and closing the air-outlet cock *c*. Steam is then introduced into the apparatus until the scum or slime is all removed, which is readily ascertained from the fact that when no more scum or slime is present in the apparatus the condensed steam will run off clear from the cock *d*, and the apparatus will then be as efficient as it was when first put up.

Having now described my invention, what I claim, and desire to secure by Letters Patent, is—

An apparatus for manufacturing vinegar, consisting of the cask or receiver A, having open grating *a*, by which it is horizontally divided into two chambers of unequal capacity, the lower part, C, of the apparatus having air-inlet *b*, a level-indicator, filling and discharge apertures, the upper part, B, having air-outlet *c*, and thermometer *e*, all arranged, constructed, and operating substantially as and for the purpose specified.

In witness that I claim the foregoing I have hereunto set my hand this 30th day of September, 1880, at the city of Düsseldorf, Germany.

VICTOR MICHAELIS.

In presence of—
P. HEASTERT,
H. DIESCHBOURG.